United States Patent [19]

Price et al.

[11] Patent Number: 5,120,778
[45] Date of Patent: Jun. 9, 1992

[54] FLAME RETARDANT POLYCARBONATE COMPOSITION HAVING IMPROVED IMPACT STRENGTH

[75] Inventors: Ronald L. Price, Weirton, W. Va.; Charles E. Lundy, Krefeld-Uerdingen, Fed. Rep. of Germany; Sivaram Krishnan, Pittsburgh, Pa.

[73] Assignee: Miles Inc., Pittsburgh, Pa.

[21] Appl. No.: 693,869

[22] Filed: Apr. 30, 1991

[51] Int. Cl.$^5$ .............................. C08K 5/34; C08K 5/42; C08K 5/53

[52] U.S. Cl. ...................................... 524/94; 524/292; 524/293; 524/435; 524/436; 524/437; 524/540; 525/67

[58] Field of Search ................. 524/94, 292, 293, 435, 524/436, 437, 540; 525/67

[56] References Cited

U.S. PATENT DOCUMENTS

| | | | |
|---|---|---|---|
| 4,104,253 | 8/1978 | Mark | 524/110 |
| 4,208,489 | 6/1980 | Schmidt et al. | 524/94 |
| 4,552,911 | 11/1985 | Cohnen et al. | 524/94 |
| 4,705,827 | 11/1987 | Kodama et al. | 525/67 |
| 4,786,671 | 11/1988 | Kress et al. | 524/94 |
| 4,996,248 | 2/1991 | Nelson et al. | 524/110 |
| 5,021,504 | 6/1991 | Fujita et al. | 525/67 |
| 5,021,510 | 6/1991 | Vroomans | 525/67 |

FOREIGN PATENT DOCUMENTS 73053 6/1976 Japan .................................. 524/292

Primary Examiner—Kriellion S. Morgan
Attorney, Agent, or Firm—Joseph C. Gil; Aron Preis

[57] ABSTRACT

A thermoplastic molding composition is disclosed which contains a homogeneous blend of a polycarbonate resin, a graft-modified olefin rubber and, a particular flame retardant package containing a salt, halogenated phthalimine, polytetrafluoroethylene and an oligomeric carbonate. The composition was found to be suitable for preparing molded articles having an excellent level of flame resistance and impact properties.

14 Claims, No Drawings

FLAME RETARDANT POLYCARBONATE COMPOSITION HAVING IMPROVED IMPACT STRENGTH

FIELD OF THE INVENTION

The invention relates to thermoplastic molding compositions and more particularly to compositions based on polycarbonate resins which are rendered flame retardant and impact resistant.

SUMMARY OF THE INVENTION

A thermoplastic molding composition is disclosed which contains a homogeneous blend of a polycarbonate resin, a graft-modified olefin rubber and, a particular flame retardant package containing a salt, halogenated phthalimide polytetrafluoroethylene and an oligomeric halogenated carbonate. The composition was found to be suitable for preparing molded articles having an excellent level of flame resistance and impact properties.

BACKGROUND OF THE INVENTION

Aromatic polycarbonate resins are well known and have long been used in molding compositions for the preparation of tough, dimensionally stable articles. The chemistry, synthesis, properties and applications of polycarbonates are extensively discussed in the manuscript Chemistry and Physics of Polycarbonates, by Schnell, Interscience, 1964 and Polycarbonates by Christopher and Fox, Reinhold, 1962.

Although polycarbonates have some inherent flame resistance, increasingly more stringent requirements for improved flame resistance are reflected in issuance of the large number of patents relating to this technology. Among the methods to improve flame retardance mention may be made of the addition or incorporation of large amounts of halogen (U.S. Pat. Nos. 3,751,400; 3,382,207 and 3,334,154). In U.S. Pat. No. 3,775,367 there is taught adding of an organic and/or an inorganic metal salt to the polycarbonate resin.

Additions of alkali salts of perfluoroalkane sulfonic acids and organic alkali salts of organic carboxylic acids have been disclosed in U.S. Pat. No. 3,836,490 and in U.S. Pat. No. 3,775,367. Also noted is German Published Patent No. 2,149,311 which discloses the use of insoluble alkali metal salts, particularly salts of inorganic acids such as phosphonic acids and sulphonic acids. Flame retardant polycarbonate compositions containing alkali metal salts or an inorganic acid are disclosed in U.S. Pat. No. 4,223,100. U.S. Pat. No. 3,535,300 discloses the use of small amounts of specified metal salts (which do not include alkali metal salts) in combination with halogen carried on the polymeric backbone or on an additive. U.S. Pat. No. 4,110,299 teaches adding of alkali or alkaline earth metal salts of organic acids in combination with additives such as inorganic halide and an organic monomeric or polyemric aromatic or heterocyclic halide improve the flame retardance of an aromatic polycarbonate. zo Also noted are the teaching in regard to the drip suppression of the compositions when they are exposed to a flame. In German Patent No. 2,535,262 there is a teaching to add fluorinated polyolefins such as polytetrafluroroethylene (PTFE) to a polycarbonate containing organic alkali metal salt to retard dripping. U.S. Pat. No. 4,110,299 discloses adding to a polycarbonate resin fluorinated polyolefin, fibrous glass or a siloxane, in combination with certain salts and an inorganic halide to diminish tendency to drip. In PCT application WO 80/00084 there is disclosed —in Example 13—a blend of aromatic polycarbonate and a block copolymer of polycarbonate and polydimethylsiloxane (57%/43%) and including sodium salt of trichlorobenzene sulfonic acid. The blend was noted to have improved resistance to stress crazing. The document generally discloses improved ductility, solvent resistance and flame retardance characteristic of blends of polycarbonates and a block copolymer of polycarbonate and polydiorganosiloxane.

Also relevant in this context is U.S. Pat. No. 4,880,864 which disclosed adding a metal salt of an inorganic acid to a polydiorganosiloxane copolycarbonate for improving the flame retardance of the resin. A flame resistant, impact modified polycarbonate resin was disclosed in U.S. Pat. No. 4,786,686. The improved composition is said to include a rubbery polymer containing residual ethylenic unsaturation and a fluorine containing polymer of the fibril forming type as additions to the polycarbonate resin.

In copending U.S. Pat. Application, Ser. No. 07/615,556 filed Nov. 19, 1990 there is disclosed an impact modified polycarbonate composition having a high melt flow rate containing the grafted olefinic copolymer of the present invention. In copending U.S. Pat. Application, Ser. No. 07/615,196 filed Nov. 19,1990 there is disclosed a molding composition having improved flame retardance and impact properties based on an impact modifier which is a maleic anhydride-functionalized block copolymer which consists of polystyrene endblocks and poly(ethylene/butylene) midblocks. Mobay Corporation is the assignee of these patent applications as well as of the present application.

DETAILED DESCRIPTION OF THE INVENTION

Aromatic polycarbonates within the scope of the present invention are homopolycarbonates and copolycarbonates and mixtures thereof.

The polycarbonates generally have a weight average molecular weight of 10,000-200,000, preferably 20,000-80,000 and their melt flow rate, per ASTM D-1238 at 300° C., is about 1 to about 65 gm/10 min., preferably about 2-15 gm/10 min. They may be prepared, for example, by the know diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, New York, 1964, all incorporated herein by reference).

In the present context, dihydroxy compounds suitable for the preparation of the polycarbonates of the inventor conform to the structural formulae (1) or (2).

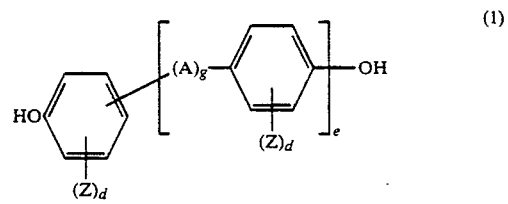

-continued

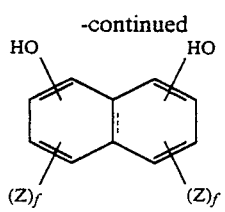

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO—, or —$SO_2$—or a radical conforming to

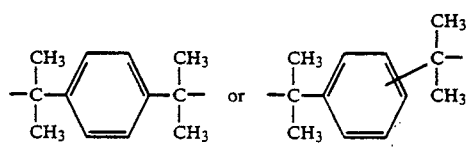

e and g both denote the number 0 to 1;

Z denotes F, Cl, Br or $C_1$-$C_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)alkanes, bis-(hydroxyphenyl) ethers, bis-(hydroxy phenyl)-ketones, bis-(hydroxyphenyl)-sulfoxides, bis-(hydroxyphenyl) -sulfides, bis-(hydroxyphenyl)-sulfones, and α,α-bis-(hydroxy-phenyl) -diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis -(4-hydroxyphenyl)-2-methyl-butane, 1,1-bis-(4-hydroxyphenyl)-cyclohexane, α,α'-bis -(4-hydroxyphenyl)-p-diisopropylbenzene, 2,2-bis -(3-methyl-4hydroxyphenyl)-propane, 2,2-bis -(3-chloro-4-hydroxyphenyl)propane, bis-(3,5-dimethyl-4-hydroxyphenyl)-methane, 2,2,-bis-(3,5-dimethyl-4-hydroxyphenyl)-propane, bis-(3,5-dimethyl-4-hydroxyphenyl)-sulfoxide, bis-(3,5-dimethyl-4-hydroxyphenyl)-sulfone hydroxybenzophenone, 2,4-bis-(3,5-dimethyl -4-hydroxyphenyl)cycloheone, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl) -propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05-2.0 mol % (relative to the bisphenols) of polyhydroxy compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri(4-hydroxyphenyl) heptane; 1,3,5-tri-(4-hydroxphenyl)-benzene; 1,1,1-tri (4-hydroxyphenyl)-ethane; tri-(4-hydroxyphenyl)-phenylmethane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis -(4-hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol A-based homopolycarbonate resins differing in terms of their respective molecular weights and characterized in that their melt flow indices (MFR) per ASTM D-1238 are about 16.5-24, 13-16, 7.5-13.0 and 3.5-6.5 g/10 min., respectively. These are products of Mobay Corporation of Pittsburgh, Pennsylvania.

Other polycarbonate resins suitable in the practice of the invention have been disclosed in U.S. Pat. Nos. 3,030,331; 3,169,121; 3,395,119; 3,729,447; 4,255,556; 4,260,731; 4,369,303 and 4,714,746 all of which are incorporated by reference herein.

The polytetrafluoroethylene -herein PTFE- suitable for use in the present invention is a well known, commercially available product. Characteristically, the PTFE of the invention forms fibrils when subjected to shear. Among the suitable PTFE compounds are those described in U.S. Pat. Nos. 3,005,795 and 3,671,487 incorporated herein by reference and in German Published Patent No. 2,535,262. A particularly preferred form of PTFE is available from DuPont as TEFLON Type 6 and is designated by the ASTM as Type 3.

The PTFE compound may conveniently be used in amounts up to about 2 wt. % based on the weight of the total composition.

The halogenated phthalimide suitable in the present context is characterized in that it contains at least 50, preferably at least 60 weight percent of halogen. The preferred halogen is bromine. The preferred phthalimide conforms structurally to

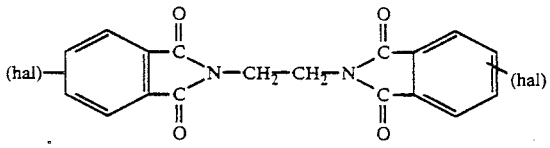

the most preferred halogenated phthalimide is 1,2-bis (tetrabromo-phthalimido)-ethane which is available under the trade name Saytex BT 93 from Ethyl Chemicals.

The salts -herein salt- useful in the present invention include those formed between an alkali metal or alkaline earth metal and an inorganic acid.

Lithium sodium, potassium, magnesium, calcium and barium salts are preferred. Inorganic acids in the present context include any compound which meets the traditional tests of acidity and contains a complex ion. Preferred acids contain oxo-anion or fluoro-anion complexes.

The most preferred salts are the alkali or alkaline-earth metal complex fluoro-anion salts or complex oxo-anion salts. This terminology being derived from the discussion of fluorine compounds contained in the text "Advanced Inorganic Chemistry" by F.A. Cotton and G. Wilkinson, Interscience Publishers, 1962, incorporation herein by reference. Suitable inorganic alkali metal complex fluoro anion salts include $KBF_4$, $K_3AlF_6$, $KAlF_4$, $K_2SiF_6$ $Na_3AlF_6$, $KPF_6$, $NaSbF_6$, $Na_3FeF_6$, $NaPF_6$, $Na_2SiF_6$, $Na_2TiF_6$, $NaBF_4$, $K_2TaF_7$, $K_2NbF_7$ $KSbF_6$, $K_2NiF_6$, $K_2TiF_6$, $LiBF_4$, $LiPF_6$, $Li_2BeF_4$, $Li_3AlF_6$, $MgSiF_6$, and $BaSiF_6$.

$Li_3AlF_6$, $BaSiF_6$, $KBF_4$, $K_3AlF_6$, $KAlF_4$, $K_2SiF_6$ and $Na_3ALF_6$ are the preferred metal complex fluoro-anion salts and $Na_3ALF_6$ (cyrolite) is the most preferred complex fluoro-anion salt. Among the suitable complex oxo-anion salts are the alkali and alkaline-earth salts of carbonic acid, such as $Na_2CO_3$, $K_2CO_3$, $MgCO_3$, $CaCO_3$, $BaCO_3$ and $BaVO_3$. Other suitable salts are sulfates, phosphates and tungstenates. The most preferred salts of oxo-anion complex acids are $BaCO_3$ and $BaVO_3$.

The salts may be used in any effective amount up to about 1 wt. % based on the total weight of the copolymer. It is preferred to use no less than about 0.1 wt. % and more preferably to use no more than about 1.0%.

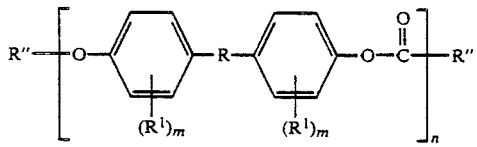

wherein R is a $C_1-C_{10}$ divalent hydrocarbon radical, or a —O—, —S— or —SO$_2$— radical, preferably alkylidene, most preferably propylidene;

R' independently denotes a halogen atom, prefrably chlorine or bromine, most preferably bromine;

R" denotes phenyl including substituted phenyl, n is 5–15 and m is 1 to 4, preferably 2.

The grafted olefinic copolymer in the context of the present invention is a graft polymer of one or more unsaturated dicarboxylic acids or an acid anhydride on an olefinic copolymer backbone having a weight average molecular weight of about 25,000 to 500,000, preferably 30,000 to 100,000 and a glass transition temperature below −30° C., preferably below −50° C. Suitable acids include maleic, citraconic, aconitic, itaconic, citric and fumaric acids and their anhydrides. The copolymer of the invention is preferably substantially amorphous.

A preferred copolymer has an ethylene-propylene copolymer backbone which is grafted with one or more unsaturated cyclic anhydrides, preferably maleic acid anhydride. The amount of ethylene and propylene in the copolymer backbone may range for each of these components between 1 and 99 percent by weight, relative to the weight of the backbone. The amount of the grafted phase is about 0.1 to 10%, preferably 0.5 to 1.0 % most preferably, about 0.7% relative to the weight of the grafted olefinic copolymer. A suitable copolymer is available commercially from Exxon under the trade name Exxelor VA 1803.

The "critical thickness" of the composition of the invention is a material parameter which corresponds to the maximum thickness which the part molded from the composition may have while still maintaining ductility in notched Izod impact test per ASTM D-256. Parts having a thickness greater than the critical thickness fail in a brittle fashion. The composition of the invention is characterized in that its ductility is maintained for molded articles having a thickness of greater than 200 mils, preferably greater than 220 mils.

The procedures used in the determinations of the flammability ratings of polycarbonate compositions in accordance with UL-94 and in accordance with UL-94 5V are well known in the art. Specific note is made of the UL-94 5V test and the ratings A and B thereof.

In accordance with the test for flammability of plastic materials - UL-94 "4 Vertical Burning Test for Classifying Materials 94-5 VA or 94-5VB", a material classed 4-5VA shell.

"A. Not have any bar specimens that burn with flaming or glowing combustion for more than 60 seconds after the fifth flame.

B. Not have any bar specimens that drip flaming particles that ignite dry absorbent surgical cottong heated 12 inches (305 mm) below the test specimens.

C. Not have any plaque specimens that exhibit a burn through (hole)."

The classfication 94-5VB designates a material which althugh meeting the criteria A&B above, "permit a burn through (hole) on plaque specimen."

The composition of the invention is characterized in that it combined good flammability rating as determined in accordance with the rigorous UL-94 5V, and good impact performance, critical thickness greater than 200 mils.

The composition of the invention contains, 0.1 to 2.0, preferably 0.2 to 0.5 percent of PTFE, The composition of the invention contains, 0.1 to 2.0, preferably 0.2 to 0.5 percent of PTFE, 0.1 to 1.0, preferably 0.2 to 0.4 percent of the salt, 0.5 to 2.0, preferably 0.5 to 1.0 percent of the oligomeric halogenated carbonate, 0.1 to 4.0, preferably 0.5 to 1.0 percent of the halogenated phthalimide, and 0.5 to 10, preferably 1.0 to 3.0 percent of the graft modified olefin rubber.

The percents noted above are relative to the weight of the composition.

The composition of the invention may be prepared conventionally, using procedures well known in the art of thermoplastic molding compositions. Further, additives reinforcements, fillers, stabilizers and mold release agents, which are known for their efficacy in the context of polycarbonate molding compositions are suitable for use in the composition of the invention.

Experimental

Compositions within the scope of the invention were prepared and their properties tested. The compositions described below were prepared by conventional means entailing melt blending, extrusion and pelletizing and the test specimens were molded from the composition by injection. In the preparation of these composition there was included a small amount of carbon black pigment which was introduced as a 1% polycarbonate concentrate, —designated in the table below as "pigmented concentrate"—has no criticality in the present context.

A comparison between the properties of these compositions and other compositions which are not within the scope of the invention is presented below. The amounts of the components are given in percent relative to the weight of the composition.

In the experiments described below, the polycarbonate resin was a homopolycarbonate based on bisphenol-A having a melt flow index of about 11.0 g/10 min. per ASTM D 1238 (Makrolon 2608, from Mobay Corporation). The halogenated imide used in the experiments was 1,2-bis-(tetrabromophthalimido)ethane. The PTFE is a fibrilating product available from DuPont &Co. The tetrabromo-oligocarbonate (TBOC) used in the experiments which are described below had a degree of polymerization of 5.

The impact modifier used in the comparative examples was Paraloid EXL-2330 - designated in the table below as "C" an acrylate rubber, core-shell impact modifier, a product of Rohm & Haas. The modifier designated "A" was Paraloid EXL 3607 which is a known impact modifier based on butadiene- MBS type available commercially from Rohm & Haas. The composition in accordance with the present invention, represented by Example 3, contains, as the impact modifier, Exxelor VA 1803, designated "B" in the table below.

| Example | 1 | 2 | 3 | 4 |
|---|---|---|---|---|
| Polycarbonate, | 97.5 | 95.05 | 95.05 | 95.05 |
| PTFE, | 0.2 | 0.2 | 0.2 | 0.2 |
| cryolite, | 0.25 | 0.25 | 0.25 | 0.25 |
| halogenated phthalmide | 0.5 | 0.5 | 0.5 | 0.5 |
| TBOC*, | 1.0 | 1.0 | 1.0 | 1.0 |
| Pigmented concentrate, | 1.0 | 1.0 | 1.0 | 1.0 |
| Impact modifier | | | | |
| "A" | — | 2.0 | — | — |
| "B" | — | — | 2.0 | — |
| "C" | — | — | — | 2.0 |
| Properties: | | | | |
| Critical Thickness, mils | 127 | 248 | 247 | 165 |
| Flammability, UL-94 1/16" | | | | |
| Class | V-0 | V-0 | V-0 | V-0 |
| Burning time, sec | 2.2 | 2.1 | 1.6 | 3.7 |
| drips | 0/5 | 0/5 | 0/5 | 0/5 |
| Flammability, UL-94, 5V 1" | | | | |
| Pass/fail | fail | fail | pass-A[1] | pass-B[1] |
| drips | 2/5 | 2/5 | 0/5** | 1/5*** |

*Tetrabromo bisphenol A oligocarbonate
**the average burn time for the 5th ignition was 9.2 seconds
***the average burn time for the 5th ignition was 11.6 seconds
[1]the A and B ratings are explained in the text.

The comparison clearly points to the advantage represented by the composition of the invention where an exceptional flame retardance is combined with high impact resistance. The comparison exmapels which were identical in all respects except for th tyepe of impact modifier do not share these characteristics.

Although the invention has been described in detail in the foregoing for the purpose of illustration, it is to be understood that such detail is solely for the purpsoe and the variations can be made therein by those skilled in the art without departing from the spirit and scope of the invention except as it may be limited by the claims.

What is claimed is:

1. A thermoplastic molding composition comprising
   (i) a polycarbonate resin,
   (ii) fibrilating PTFE,
   (iii) a salt formed from an alkali metal or an alkaline earth metal and an inorganic acid complex ion,
   (iv) a halogenated phthalimide,
   (v) a halogenated oligocarbonate, and
   (vi) a graft modified olefin rubber,
   wherein said graft modified olefin rubber is a graft polymer of one or more unsaturated dicarboxylic acids or their anhydride on an olefinic copolymer backbone having a weight average molecular weight of about 25,000 to 500,000, and a glass transition temperature below -30° C., said composition being characterized in that it exhibits a critical thickness greater than 200 mils and in that it achieves a pass rating in accordance with the flammability test of UL-94 5VA at 1/8 inch.

2. The thermoplastic molding composition of claim 1 wherein said PTFE is present in an amount of 0.2 to 0.4 percent relative to the weight of the composition.

3. The thermoplastic molding composition of claim 1 wherein said salt is present in an amount of 0.2 to 0.4 percent relative to the weight of the composition.

4. The thermoplastic molding composition of claim 1 wherein said halogenated phthalimide is present in an amount of 0.5 to 1.0, percent relative to the weight of the composition.

5. The thermoplastic moldlng of claim 1 wherein said graft modified olefin rubber is present in an amount of 1.0 to 3.0, percent relative to the weight of the composition.

6. The composition of claim 1 wherein said molecular weight is about 30,000 to 100,000.

7. The composition of claim 6 wherein said glass transition temperature is below —50° C.

8. The composition of claim 6 wherein said polycarbonate is a homopolymer based on bisphenol A.

9. The composition of claim 1 wherein said copolymer is substantially amorphous.

10. The composition of claim 1 wherein said copolymer comprises units derived from ethylene and propylene.

11. The composition of claim 10 wherein said copolymer is grafted with one or more unsaturated cyclic anhydrides.

12. The composition of claim 11 wherein said anhydride is maleic acid anhydride

13. The composition of claim 12 wherein said anhydride is present in an amount of about 0.1 to 10% relative to the weight of the grafted olefinic copolymer.

14. The composition of claim 13 wherein said polycarbonate is a homopolymer based on bisphenol A, the halogenated phthalimide conforms to

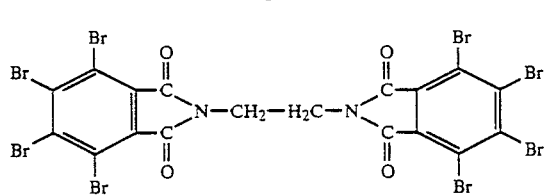
and the graft modified olefin rubber comprise maleic acid anhydride, ethylene and propylene.
* * * * *
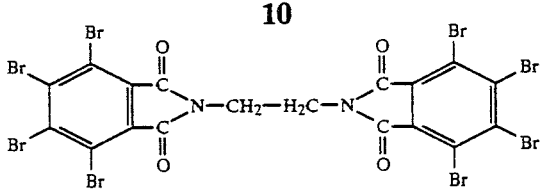
and the graft modified olefin rubber comprise maleic acid anhydride, ethylene and propylene.
* * * * *